(12) United States Patent
Luettig

(10) Patent No.: US 8,403,263 B2
(45) Date of Patent: Mar. 26, 2013

(54) COMPOSITE AND STRUCTURE, PARTICULARLY IN THE AEROSPACE SECTOR

(75) Inventor: Helmut Luettig, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 135 days.

(21) Appl. No.: 12/915,207

(22) Filed: Oct. 29, 2010

(65) Prior Publication Data

US 2011/0095130 A1 Apr. 28, 2011

Related U.S. Application Data

(63) Continuation of application No. PCT/EP2009/053773, filed on Mar. 31, 2009.

(60) Provisional application No. 61/130,391, filed on May 30, 2008.

(30) Foreign Application Priority Data

May 30, 2008 (DE) .......................... 10 2008 002 117

(51) Int. Cl.
*B64C 1/00* (2006.01)
(52) U.S. Cl. ...................... 244/119; 244/120; 244/123.1
(58) Field of Classification Search .................. 244/119, 244/117 R, 123.1, 123, 123.7, 123.8, 231.9; 29/897.2; 428/119
See application file for complete search history.

(56) References Cited

U.S. PATENT DOCUMENTS

| | | | | |
|---|---|---|---|---|
| 5,527,414 | A * | 6/1996 | Dublinski et al. | 156/245 |
| 7,716,835 | B2 * | 5/2010 | Johnson et al. | 29/897.2 |
| 7,861,969 | B2 * | 1/2011 | Guzman et al. | 244/120 |
| 7,879,276 | B2 * | 2/2011 | Guzman et al. | 264/248 |
| 8,042,768 | B2 * | 10/2011 | Liguore et al. | 244/119 |
| 2002/0178992 | A1 * | 12/2002 | Lewit | 114/357 |
| 2003/0164623 | A1 | 9/2003 | Yoshida et al. | |
| 2008/0223987 | A1 * | 9/2008 | Halme et al. | 244/123.1 |
| 2010/0237195 | A1 * | 9/2010 | Stephan | 244/132 |
| 2010/0320319 | A1 * | 12/2010 | Liguore et al. | 244/119 |

FOREIGN PATENT DOCUMENTS

| | | |
|---|---|---|
| CN | 101151142 | 3/2008 |
| DE | 102006 026538 | 12/2007 |
| EP | 1640252 A1 | 8/2005 |
| GB | 457369 | 11/1936 |
| WO | WO 02/083389 A2 | 10/2002 |

OTHER PUBLICATIONS

International Search Report / Opinion for PCT/EP2009/053773 dated Oct. 29, 2009.
German Office Action from DE 10 2008 002 117.2 dated Nov. 16, 2010.
Chinese Office Action for Application No. 200980119943.3 dated Dec. 4, 2012.

* cited by examiner

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

The present invention provides a composite, in particular in the field of aviation and aerospace, comprising an omega-stringer that comprises a comb portion, and a connecting member that is connected at one end to the comb portion of the omega-stringer and can be connected at its other end to a standard coupling member. The idea underlying the present invention consists in forming omega-stringers with a connection zone that, on the one hand, is coupled to the comb portion of the omega-stringer and therefore makes it possible to transfer comparatively high loads and, on the other hand, can be connected to a standard coupling member so as to utilize the advantages of standard coupling members of this type when connecting omega-stringers to other stringers, for example T-stringers or other omega-stringers.

8 Claims, 4 Drawing Sheets

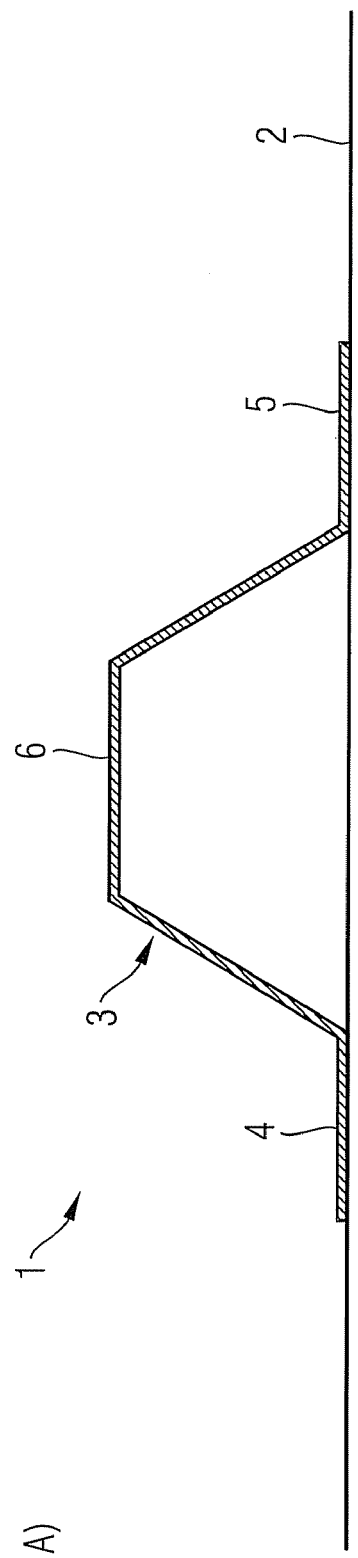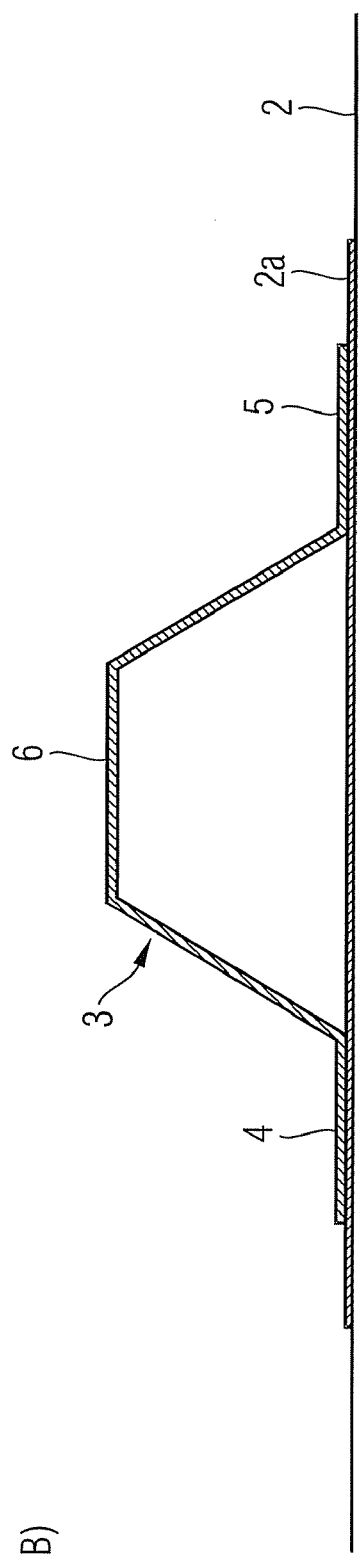

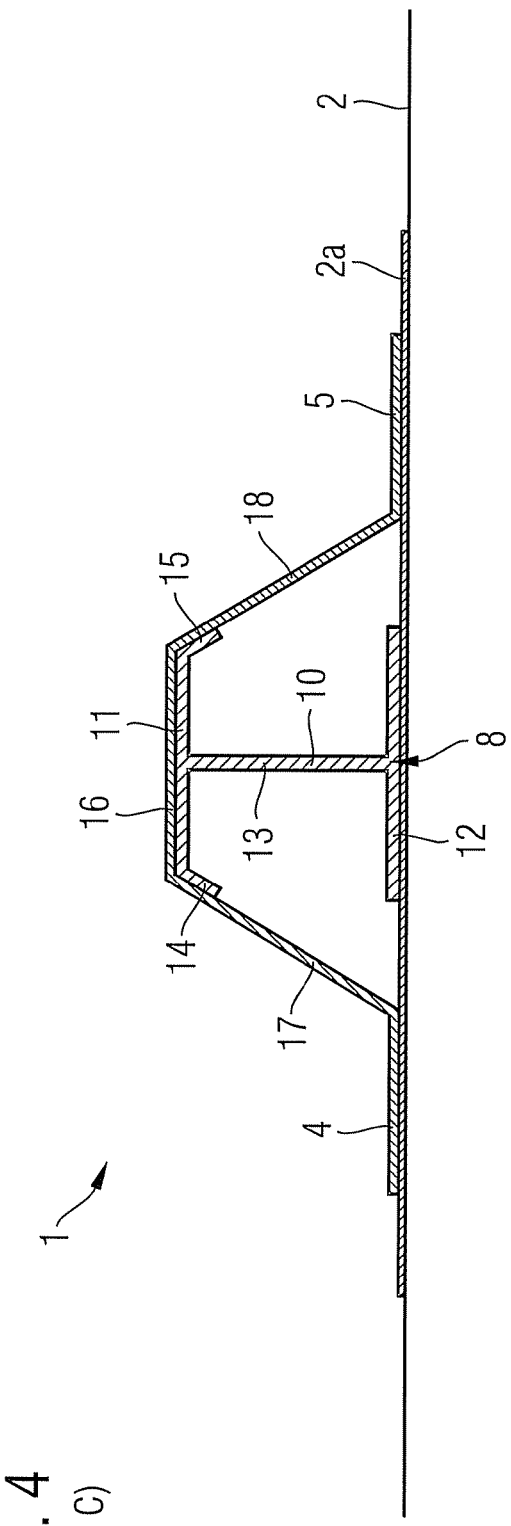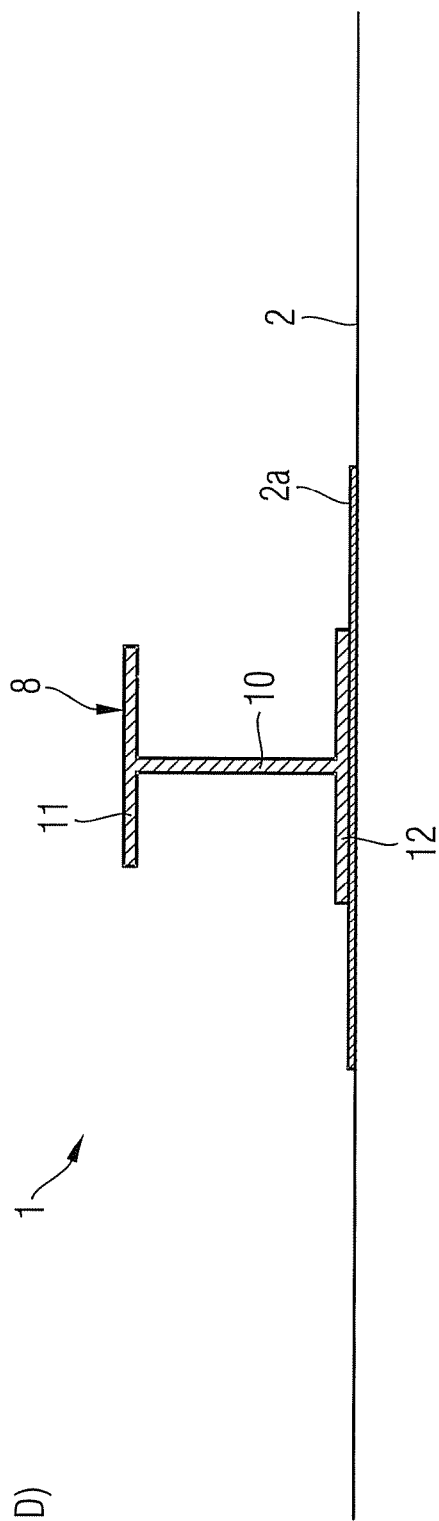

(E - E)

COMPOSITE AND STRUCTURE, PARTICULARLY IN THE AEROSPACE SECTOR

CROSS-REFERENCE TO RELATED APPLICATIONS

This application is a continuation of PCT/EP2009/053773 filed Mar. 31, 2009 and claims the benefit of U.S. Provisional Application No. 61/130,391, filed May 30, 2008 and German Patent Application No. 10 2008 002 117.2, filed May 30, 2008, the entire disclosures of which are herein incorporated by reference.

FIELD OF THE INVENTION

The present invention relates to a composite, particularly in the field of aviation and aerospace, as well as to a structure, in particular to a fuselage.

Although applicable to any air- and spacecraft, the present invention and its underlying problem will be explained in greater detail with reference to a fuselage.

It has become commonplace to reinforce fuselage shells in particular using omega-stringers. Omega-stringers comprise a comb portion and two foot portions, which connect to respective opposite ends of the comb portion. The comb portion is normally trapezium-shaped or approximately semi-circular. As a result of this construction omega-stringers are particularly suitable for bracing fuselage shells of this type against buckling.

It has now proven to be problematic to connect further stringers or other longitudinal members, for example longitudinal supports, to omega-stringers of this type in the longitudinal direction thereof, for example as is necessary when joining a plurality of fuselage sections to form a fuselage or for load introduction, for example from longitudinal support members. It has also proven to be problematic to connect omega-stringers of this type to formers via clips or thrust vanes. Both problems are caused by the fact that the comb portion can only be connected with great difficulty to other members as a result of its above-mentioned geometric configuration.

It has also been known to connect omega-stringers for example to other stringers, in each case via the foot portions thereof. However, this approach is disadvantageous in that the feet of the further stringers or omega-stringers can only transfer comparatively low loads.

SUMMARY OF THE INVENTION

The object of the present invention is therefore to provide an improved possibility for connecting omega-stringers, in particular, to other stringers, longitudinal support members, formers, clips and/or thrust vanes.

This object is achieved in accordance with the invention by a composite having the features of claim 1 and/or by a structure having the features of claim 7.

A composite, in particular in the field of aviation and aerospace, is accordingly provided with an omega-stringer that comprises a comb portion and a connecting member that is connected at one end to the comb portion of the omega-stringer and can be connected at its other end to a standard coupling member.

A structure, in particular a fuselage, is also provided that comprises the composite according to the invention, a stringer and a standard coupling member, which connects the connecting member of the composite to the stringer. In accordance with another configuration of the invention another longitudinal member could also be used here instead of the stringer.

The idea underlying the present invention consists in forming omega-stringers with a connection zone that, on the one hand, is coupled to the comb portion of the omega-stringer and therefore makes it possible to transfer comparatively high loads and, on the other hand, can be connected to a standard coupling member so as to utilise the advantages of standard coupling members of this type when connecting omega-stringers to other stringers, for example T-stringers or other omega-stringers. In particular, these advantages include a high availability of standard coupling members of this type, simple connectability of these members to a skin portion, simple guidability of these members through recesses in formers, simpler connectability of these members to formers via clips or thrust vane members, simple connectability of these members to further stringers, for example T-stringers or L-stringers, as a result of corresponding geometries, and lastly also simple tolerance compensation between the omega-stringers and the further stringers to be connected thereto in the longitudinal direction.

Advantageous developments of and improvements to the invention will emerge from the sub-claims.

In accordance with a preferred development of the composite according to the invention the connecting member comprises, at one end, an I-shaped cross-section with two flange portions and a web portion connecting them, one of the flange portions being connected to the comb portion of the omega-stringer. A connection with a very high loading capacity is therefore produced between the connecting member and the omega-stringer.

In accordance with a further preferred development of the composite according to the invention the comb portion of the omega-stringer is composed of a roof portion and two bevel portions connecting to opposite ends of the roof portion. The comb portion is therefore preferably approximately trapezium-shaped in cross-section (trapezium that is open on one side), which naturally does not rule out the possibility that the comb portion could, for example, also be approximately rectangular in cross-section. The one of the flange portions is also preferably connected to the roof portion over its entire width. Bevels are preferably provided moulded integrally on the flange portion and connected to the bevel portions of the comb portion, overlapping at least in part. A very extensive connection region is therefore produced between the omega-stringer and the connecting member, which has a positive effect on the maximum transferable loads, particularly when the connecting member is adhered to the omega-stringer.

For example the bevel portions can extend at an angle of approximately 30 to 70° to the roof portion.

In accordance with a further preferred development of the composite according to the invention, said composite further comprises a planar portion. The omega-stringer is preferably formed with two foot portions, which connect to opposite ends of the comb portion and are oriented so as to be substantially mutually opposed. The foot portions of the omega-stringers as well as the other portion of the connecting member are preferably connected to the planar portion. The planar portion is preferably a skin of an aircraft or spacecraft, in particular a fuselage skin. However, the planar portion could also be, for example, a component of an intermediate deck in an aircraft.

In accordance with a further preferred development of the composite according to the invention the connecting member comprises, at its other end, an at least L-shaped cross-section with a foot portion that is connected to the planar member, and a web portion, the at least L-shaped cross-section being formed by trimming the I-shaped (also referred to as double T-shaped) cross-section. In the present context 'at least L-shaped' is understood to mean that the cross-section of the connecting member comprises at least one L-shaped component. The cross-section of the connecting member is preferably L-, C-, Z- or T-shaped, the cross-sections of these each comprising an L-shaped component in accordance with the definition in the present case. An at least L-shaped cross-section of this type can be connected particularly efficiently by its web portion to clips or thrust vanes, and/or by its foot portion to the skin portion or a skin doubler. Above all however, the at least L-shaped cross-section can be connected without difficulty to a standard coupling member with an L-, C-, Z- or T-shaped cross-section.

In accordance with a further preferred development of the composite according to the invention, the connecting member comprises a mounting portion for mounting a thrust vane or clip, in particular a former angle bracket.

In accordance with a preferred development of the structure according to the invention the standard coupling member comprises an L-, C-, Z- or T-shaped cross-section. The standard coupling member is preferably configured as a stringer with an approximately constant cross-section. Coupling members of this type can be used universally, comprise a geometry that is beneficial for connection to other members, for example a skin portion, and are also comparatively rigid.

In accordance with a further preferred development of the structure according to the invention the stringer is connected to the standard coupling member by a further connecting member. The stringer and the further connecting member form a further composite according to the invention. In accordance with this development a structure of the following sequence is thus formed: omega-stringer-connecting member-standard coupling member-connecting member-omega-stringer.

In accordance with a further preferred development of the structure according to the invention a former is provided that comprises a recess, through which the standard coupling member is guided. A specific adaptation of the cross-section of the recess to the member guided through is therefore not necessary.

In accordance with a further preferred development of the structure according to the invention the former is connected to the mounting portion of the connection member or further connecting member by an angle bracket. The angle bracket is mounted to the mounting portion of the connecting member with low effort owing to the good accessibility of the mounting portion.

The omega-stringer and/or the connecting member are preferably connected to the planar portion by a doubler.

The omega-stringer, the connecting member, the standard coupling member, the former, the planar portion, the doubler and/or the angle bracket preferably comprise(s) a fibre composite material, in particular a CFRP.

BRIEF DESCRIPTION OF THE DRAWINGS

The invention will be explained in greater detail hereinafter by means of embodiments and with reference to the accompanying figures in the drawings, in which:

FIG. 2 is a sectional view along A-A from FIG. 1;
FIG. 3 is a sectional view along B-B from FIG. 1;
FIG. 4 is a sectional view along C-C from FIG. 1;
FIG. 5 is a sectional view along D-D from FIG. 1.

DESCRIPTION OF EXEMPLARY EMBODIMENTS

Figure 1:
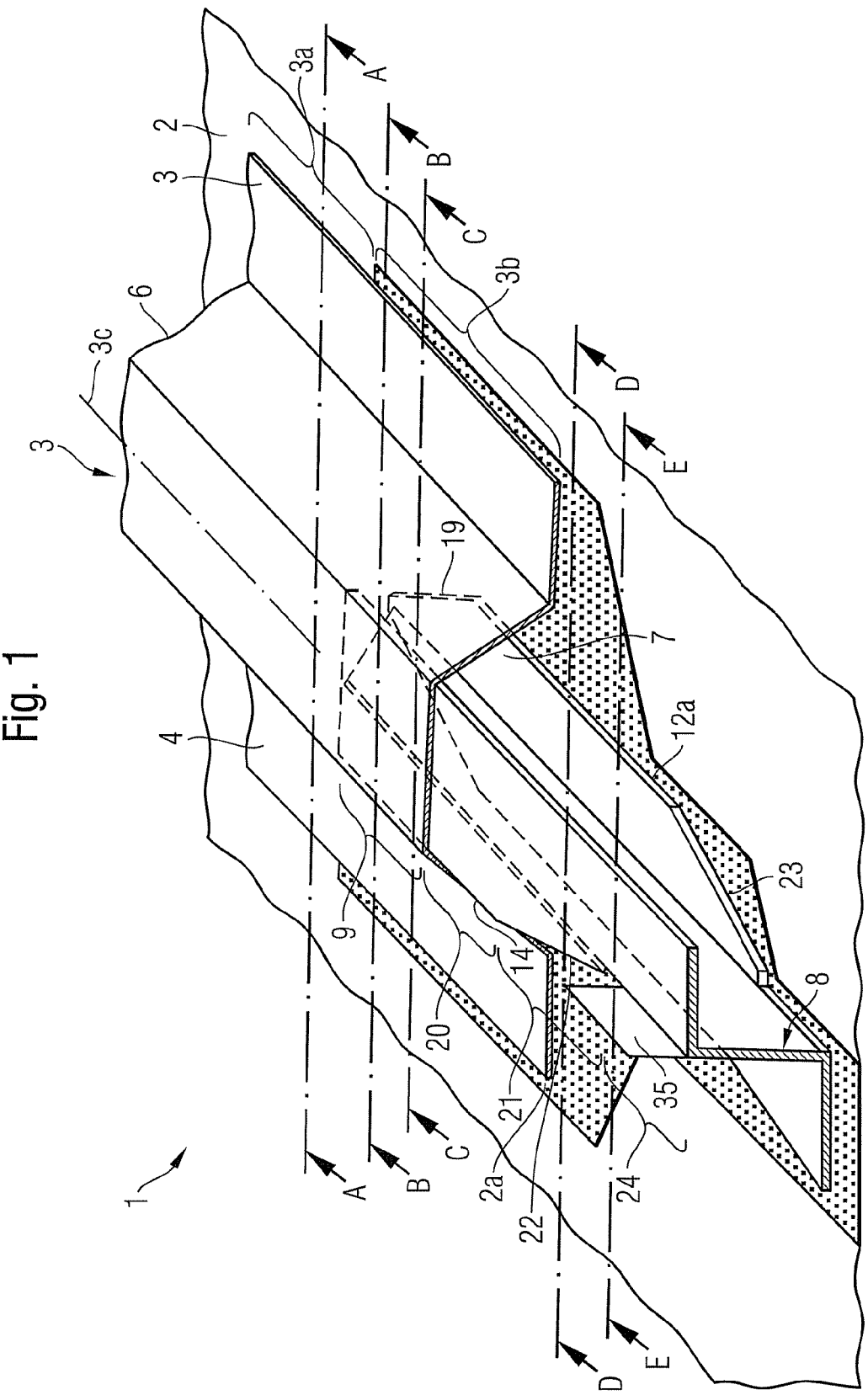
FIG. 1 is a perspective view of a composite of the present invention in accordance with one embodiment.

In the figures like reference numerals denote like or functionally like components, unless otherwise specified.

FIG. 1 is a perspective view of a composite 1 according to a preferred embodiment of the present invention.

In accordance with the present embodiment the composite 1 comprises a fuselage shell 2 made of a fibre composite material, to which an omega-stringer 3, also made of a fibre composite material, is applied, in particular riveted or adhered. For example the fuselage shell 2 forms a portion of a fuselage barrel (not shown in greater detail). In accordance with the present embodiment the omega-stringer 3 extends in the longitudinal direction 3c of the fuselage shell 2.

The omega-stringer 3 is composed of foot portions 4, 5 and a comb portion 6, which is trapezium-shaped and interconnects the foot portions 4, 5. In its central region 3a the omega-stringer 3 is directly connected to the fuselage shell 2 by its foot portions 4, 5 (see FIG. 2), whilst in its end region 3b it is connected to the fuselage shell 2 by its foot portions 4, 5 via a doubler 2a (see FIG. 3), also made of a fibre composite material. The object of the doubler 2a is to further reinforce the composite 1. In the transition region between the central region 3a and the end region 3b the omega-stringer 3 preferably comprises a step (not shown) in order to accommodate the doubler 2a.

A connecting member 8 is inserted into the opening 7 in the comb portion of the omega-stringer 3. As can be seen in FIG. 4, the connecting member 8 comprises, at least in the region 9 where it extends into the omega-stringer 3, an I-shaped cross-section 10 composed of an upper flange 11 and a lower flange 12 that are connected via a web 13. Bevels 14 and 15 are preferably moulded integrally on the upper flange 11 and extend, for example, at an angle of approximately 60° to the upper flange 11. The upper flange 11 is connected to a roof portion 16 of the comb portion 6 of the omega-stringer 3 and the bevels 14, 15 are connected to respective bevel portions 17 and 18 of the comb portion 6, overlapping in part. In order to save weight the lower flange 12 can be provided in the region 9 with a sweep 19, as shown in FIG. 1, i.e. the lower flange 11 is trimmed in a bevelled manner toward its end on either side.

Downstream of the region 9, i.e. away from the end of the omega-stringer 3, the composite 1 comprises a region 20. A cross-section through the composite 1 is presented in the region 20, as shown in FIG. 5. The cross-section of the connecting member 8 is 'reduced' in the region 20 to an I-shaped cross-section, i.e. the bevels 14, 15 are dispensed with for reasons of weight reduction since they are primarily used to ensure good adhesion between the connecting member 8 and the comb portion 6 of the omega-stringer 3.

A region 21 connects to the region 20, in which region 21 the upper flange 11 (see FIG. 1) is trimmed at its edge 11a by a bevel 22 as far as the web 13, and the lower flange 12 is trimmed at its edge 12a opposite the edge 11a by a bevel 23 as far as the web 13.

Figure 6:
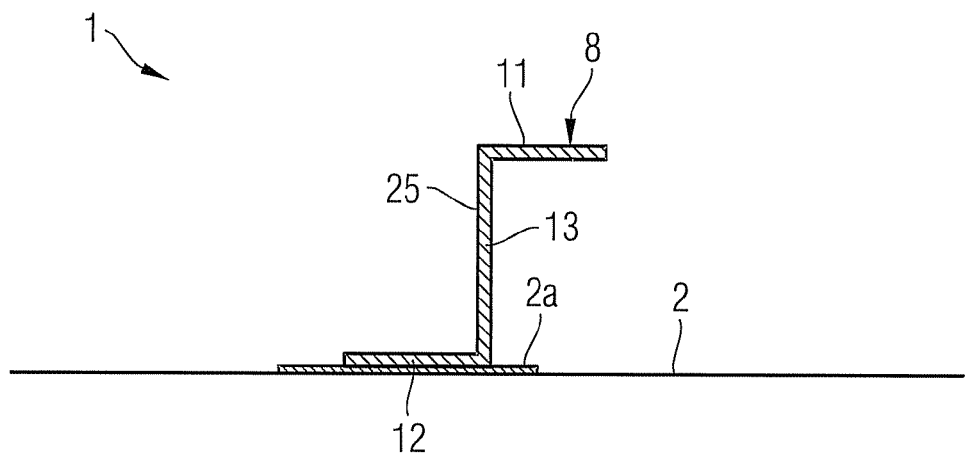
FIG. 6 is a sectional view along E-E from FIG. 1.

The connecting member 8 thus comprises a Z-shaped cross-section 25 (as shown in FIG. 6) in a region 24 arranged downstream of the region 21. As can be seen in FIG. 6, the lower flange 12 and the web 13 of the coupling member 8 form an L-shaped component of the entire cross-section 25 of the connecting member 8. The connecting member 8 preferably comprises a mounting portion 35 in the region 24, by means of which mounting portion the connecting member 8 can be connected simply, for example by rivets or adhesion, to an angle bracket for connection to a former (not shown).

The connecting member 8 is preferably formed of one piece and is produced by the corresponding cutting of the fibre plys that form the upper flange 11 and the lower flange 12.

The doubler 2a continuously connects the lower flange 12 of the connecting member to the fuselage shell 2 and is cut in such a way that it approximately follows the extension of the lower flange 12 in plan view from FIG. 1.

Figure 7:
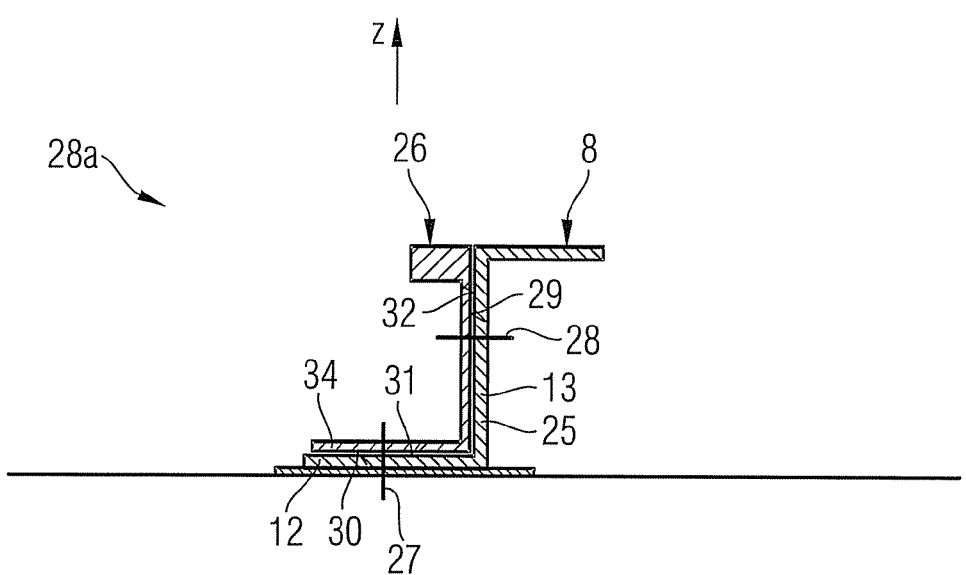
FIG. 7 shows a structure according to one embodiment of the invention that comprises the arrangement from FIG. 6 and a standard coupling member.

As shown in FIG. 7, the now Z-shaped cross-section 25 of the connecting member 8 can be connected very simply to a standard coupling member 26, for example by adhesion or rivets 27, 28, resulting in a structure 28a.

In accordance with the present embodiment the standard coupling member 26 comprises a C-shaped cross-section. The standard coupling member 26 and the connecting member 8 comprise corresponding faces 29, 30 and 31, 32 that promote a stable connection. In accordance with the present embodiment the web 33 of the coupling member 26 is connected to the web 13 of the connecting member 8 and the foot 34 of the coupling member 26 is connected to the lower flange 12 of the coupling member 8.

The coupling member 26 can now be connected in a simple manner to a further composite (not shown) comprising a stringer, in particular an omega-stringer 10, and optionally a connecting member 8, and provides tolerance compensation as a result of its flexibility about the z-axis (see FIG. 7) if the composite 1 is not flush with the further composite. For example two fuselage barrels (not shown) each comprising the composite 1 can thus be interconnected in a simple manner.

Although the present invention has been described here with reference to preferred embodiments, it is not limited to these embodiments and can be modified in various ways.

In particular, it is not restricted to the application to a fuselage structure. Instead, it can be applied to any other bearing and non-bearing structures.

The present invention provides a composite, in particular in the field of aviation and aerospace, comprising an omega-stringer that comprises a comb portion, and a connecting member that is connected at one end to the comb portion of the omega-stringer and can be connected at its other end to a standard coupling member. The idea underlying the present invention consists in forming omega-stringers with a connection zone that, on the one hand, is coupled to the comb portion of the omega-stringer and therefore makes it possible to transfer comparatively high loads and, on the other hand, can be connected to a standard coupling member so as to utilise the advantages of standard coupling members of this type when connecting omega-stringers to other stringers, for example T-stringers or other omega-stringers, or to support members.

LIST OF REFERENCE NUMERALS 1 composite
2 fuselage shell
2a doubler
3 omega-stringer
3a central region
3b end region
3c longitudinal direction
4 foot portion
5 foot portion
6 comb portion
7 opening
8 connecting member
9 region
10 I-shaped cross-section
11 upper flange
11a edge
12 lower flange
12a edge
13 web
14 bevel
15 bevel
16 roof
17 bevel portion
18 bevel portion
19 sweep
20 region
21 region
22 bevel
23 bevel
24 region
25 Z-shaped cross-section
26 standard coupling member
27 rivet
28 rivet
28a structure
29 corresponding face
30 corresponding face
31 corresponding face
32 corresponding face
33 web
34 foot
35 mounting portion

The invention claimed is:

1. A composite, in the field of aviation and aerospace, comprising:
    an omega-stringer that comprises a comb portion; and
    a connecting member comprising at least two different cross-sections,
    wherein the connecting member comprises at one end an I-shaped cross-section, wherein the connecting member extends with the end comprising the I-shaped cross-section into the omega-stringer and is connected to the comb portion of the omega-stringer, wherein the connecting member comprises at the other end a cross-section different than the I-shaped cross-section and adapted to be connected to a coupling member comprising an L-, C-, Z-, or T-shaped cross-section.

2. The composite according to claim 1, wherein the I-shaped cross-section of the one end of the connecting member comprises two flange portions and a web portion connecting them, one of the flange portions being connected to the comb portion of the omega-stringer.

3. The composite according to claim 2, wherein the comb portion of the omega-stringer is composed of a roof portion and two bevel portions connecting to opposite ends of the roof portion; and in that the one of the flange portions is connected to the roof portion over its entire width and bevels moulded integrally on the flange portion are connected to the bevel portions, overlapping in part.

4. The composite according to claim 2, wherein the composite further comprises a planar portion; and in that the omega-stringer is provided with two foot portions, which connect to opposite ends of the comb portion and are oriented so as to be substantially mutually opposed; the foot portions of the omega-stringer and the other flange portion of the connecting member being connected to the planar portion, in particular by a doubler.

5. The composite according to claim 4, wherein the connecting member comprises, at its other end, an at least L-shaped cross-section with a foot portion that is connected to the planar member, and a web portion, the at least L-shaped cross-section being formed by trimming the I-shaped cross-section.

6. The composite according to claim 1, wherein the connecting member comprises a mounting portion for mounting a thrust vane or clip, in particular a former angle bracket.

7. Structure, in particular a fuselage, comprising:
a composite according to claim 1;
a stringer; and
a coupling member that connects the connecting member of the composite to the stringer, wherein the coupling member comprises an L-, C-, Z-, or T-shaped cross-section.

8. Structure according to claim 7, wherein the stringer is connected to the coupling member by a further connecting member, and the stringer and the further connecting member form a further composite according to claim 1.

* * * * *